United States Patent [15] 3,687,884
Huang [45] Aug. 29, 1972

[54] ALKALI-SWELLABLE POLYVINYL ACETATE GRAFTED LATEXES COMPRISING VINYL ACETATE, AN ALIPHATIC ESTER OF AN UNSATURATED MONOCARBOXYLIC ACID STYRENE, AND AN UNSATURATED MONOCARBOXYLIC ACID

[72] Inventor: Denis K. Huang, Laurel, Md.
[73] Assignee: Westvaco Corporation, New York, N.Y.
[22] Filed: Aug. 3, 1970
[21] Appl. No.: 60,761

[52] U.S. Cl................................260/29.6 RW, 117/155 UA, 117/161 UT; 260/8, 260/17.4 ST, 260/29.6 RB, 260/80.8, 260/885
[51] Int. Cl..............................................C09d 3/74
[58] Field of Search..........260/29.6 RW, 80.8, 885, 29.6 RB

[56] References Cited

UNITED STATES PATENTS 1,933,052 10/1933 Fikentscher et al...260/80.8 X
3,057,812 10/1962 Straughan et al.....260/80.8 X
3,365,410 1/1968 Wesslau et al........260/80.8 X
3,366,590 1/1968 Taft......................260/80.8 X
3,421,277 1/1969 Frischmuth.....260/29.6 RB X
2,763,578 9/1956 Simons................260/80.8 X

FOREIGN PATENTS OR APPLICATIONS 1,135,406 12/1968 Great Britain

Primary Examiner—Howard E. Schain
Attorney—Richard L. Schmalz and Robert S. Grimshaw

[57] ABSTRACT

A synthetic polymeric latex comprising a major amount of vinyl acetate and minor amounts of an acrylic ester, at least one acrylic acid, and styrene is prepared by copolymerizing vinyl acetate with the acrylic ester and acid, to form a backbone polymer, and then grafting styrene onto the backbone polymer. Stable, aqueous, alkali-swellable emulsions of the synthetic polymeric latex can be prepared, and the latex can be used as a binder material in paper coating compositions to bind pigments to paper and paperboard.

17 Claims, No Drawings

ALKALI-SWELLABLE POLYVINYL ACETATE GRAFTED LATEXES COMPRISING VINYL ACETATE, AN ALIPHATIC ESTER OF AN UNSATURATED MONOCARBOXYLIC ACID STYRENE, AND AN UNSATURATED MONOCARBOXYLIC ACID

BRIEF SUMMARY OF THE INVENTION

This invention relates to novel polymeric latexes, to methods of preparing stable aqueous emulsions thereof, and to coating compositions containing the same. More particularly, this invention relates to alkali-swellable polymeric latexes comprising vinyl acetate as the major constituent, with an acrylic ester, an acrylic acid, and styrene as minor constituents, wherein styrene is grafted onto a polymer backbone prepared from the other monomers. The new latexes find great utility as pigment binders in paper coating compositions.

It is known to use polyvinyl acetate as a binder in-gredient in paper coating compositions comprising, in general, a mineral pigment and other binder ingredients such as starch, casein, or alpha-protein. From the standpoint of modern quality standards for coated papers, polyvinyl acetate homopolymer latexes are generally deficient in at least three aspects. First, the gloss produced by these latexes is relatively low compared to the demands of the industry, especially in the packaging area. Secondly, while the pigment binding properties may be classified as good, they are not outstanding for polyvinyl acetate latexes. Thirdly, it is known that the water-holding properties of polyvinyl acetate latexes are generally poor. A paper coating composition, containing a binder with little ability to hold water, may cause various problems, such as scratching and lack of uniform coating lay, during the coating operation due to the coating becoming dilatent and the binder migrating to the surface of the coating.

To improve the properties of polyvinyl acetate latexes, attempts have been made to copolymerize vinyl acetate with other monomers. For example, vinyl acetate can be copolymerized with maleic anhydride or methacrylic acid, and gloss and some other properties are improved. However, because some monomers can copolymerize with vinyl acetate in only a limited quantity, the full benefit of this procedure often cannot be fully explored. Further, because of the relatively low cost of vinyl acetate, the use of other monomers will increase the raw material cost of the latex and render it impractical from an economic standpoint.

The latexes of the present invention are economical to prepare, have excellent gloss and outstanding pigment binding properties, and are alkali-swellable and therefore have excellent water-holding properties. They are prepared by first copolymerizing vinyl acetate with an aliphatic ester of an $\alpha$-$\beta$-ethylenically unsaturated monocarboxylic acid, and at least one ethylenically unsaturated monocarboxylic acid, and then grafting styrene to the resultant polymer. By using a material such as methyl methacrylate, the gloss level of the latexes is higher than homopolymers of vinyl acetate. By grafting styrene, which does not ordinarily copolymerize with vinyl acetate, onto the base polymer, the high gloss level of the base polymer is maintained by use of the economical styrene monomer. As discussed later herein, use of a small amount of a mixture of ethylenically unsaturated monocarboxylic acids provides the final latex with outstanding alkali-swellable and water-holding properties. The resultant latexes have the properties called for today for use in high gloss coating compositions.

Grafting styrene onto the base polymer is an important feature of the present invention. Merely attempting to copolymerize vinyl acetate, methyl methacrylate, and styrene monomers, on the theory that methyl methacrylate will act as a bridging agent for the other two monomers, does not produce the desired latexes of this invention. The copolymerization technique takes about twice as long to complete as the preferred grafting method of this invention (about 8 hours versus about 4 hours), and the prolonged heating period produces undesirable side reactions which affect the stability and quality of the resultant latex. Only by first preparing the backbone polymer and then grafting styrene thereon are the desired properties of the latex produced.

The novel latexes of the present invention comprise, by weight, about 40 to 60 percent vinyl acetate, about 5 to 25 percent of an aliphatic ester of an $\alpha$-$\beta$-ethylenically unsaturated monocarboxylic acid, about 10 to 40 percent styrene, and about 1 to 5 percent of an ethylenically unsaturated monocarboxylic acid or mixtures thereof. Above about 59 percent by weight of vinyl acetate, the latex loses gloss but gains some in binding strength. Below about 45 percent by weight of vinyl acetate, the latex loses binding power and gains in gloss. The more preferred embodiments of the invention are those latexes comprising, by weight, about 50 to 59 percent vinyl acetate, about 10 to 18 percent of an acrylic ester, about 30 to 38 percent styrene, and about 1 to 3 percent ethylenically unsaturated monocarboxylic acid, with the preferred latex comprising, by weight, about 50 percent vinyl acetate, about 18 percent methyl methacrylate, about 30 percent styrene, and about 2 percent of a mixture of methacrylic acid and acrylic acid. The grafted polymers of this invention have the chemical, mechanical, and storage stabilities required for commercial applications. Further, they are alkali-swellable, with the latex particles, normally having an average particle size in the range of from 0.05 to 0.15 micron, swelling to about 2–5 times their original size when in an alkaline environment.

A single ethylenically unsaturated acid, such as methacrylic, acrylic, itaconic, and maleic anhydride, can be used as carboxylating agents for the vinyl acetate and the acrylic ester during the first stage copolymerization reaction. However, a mixture of methacrylic acid and acrylic acid is preferred since it has been found that the final latex, after grafting of styrene on the backbone polymer, is more alkali-swellable than when either acid is used alone. In fact, the acids when combined in the weight ratio of about 1 to 1.75 parts methacrylic acid to about 1 to 0.25 part acrylic acid have a synergistic effect on the alkali-swellable properties of the latex.

Examples of suitable aliphatic esters of an $\alpha$-$\beta$-ethylenically unsaturated monocarboxylic acid are acrylic esters such as methyl methacrylate, ethyl methacrylate, methyl acrylate, ethyl acrylate, 2-ethyl hexyl acrylate, and butyl acrylate. The preferred acrylic ester is methyl methacrylate.

The preferred method of making the first stage copolymer of this invention is to prepare it as an aqueous emulsion by emulsion polymerization. Conventional water-soluble anionic emulsifiers, known in vinyl acetate polymerization work, can be used alone or mixed with other anionic or non-ionic emulsifiers. For example, any of the following anionic emulsifiers can be used: alkali metal salts of the higher fatty alcohol sulfates such as sodium lauryl sulfate (SIPEX UB, for example, a product of Alcolac Chemical Corporation); alkyl aryl sulfonates such as sodium dodecyl benzene sulfonate; alkali metal higher alkyl sulfosuccinates such as sodium dioctyl sulfosuccinate and disodium N-octyl sulfosuccinate; and alkyl aryl polyoxyethylene sulfates and sulfonates such as the well-known, commercially available "Triton" compounds. Known emulsifiers, such as sodium n-dodecylpolyethoxy (50 moles) sulfate and sodium isododecylphenoxypolyethoxy (40 moles) sulfate, and mixtures thereof, may also be used. A preferred emulsifier is an anionic surface active agent known as ABEX 18S, also a product of Alcolac. Examples of water-soluble non-ionic emulsifiers include alkyl aryl polyoxyethylene alcohols; alkyl phenoxyethylene ethanols such as octyl phenoxyethylene ethanol having about 30 ethylene oxide groups per molecule; and alkyl aryl polyethylene glycol ethers. When used, the emulsifiers or emulsifiers are present in an amount of about 2.5 to 8.0 percent of the total weight of the monomers.

To prepare the polymer backbone to which styrene is subsequently grafted, a reactor is charged with water and heated to a reaction temperature between about 65 to 70° C. A nitrogen blanket is introduced. To the heated water is added a portion of a mixture of the emulsifier and catalyst, and an accelerator, if used. Then, with constant agitation, a mixture of the vinyl acetate and acrylic ester monomers, along with the ethylenically unsaturated monocarboxylic acid, is added dropwise to the reactor. When the addition of these ingredients is completed, the reaction temperature is maintained for about 30 minutes or until substantially all vinyl acetate monomer has reacted. This finishes the first stage of the process and produces an aqueous emulsion of a backbone polymer comprising vinyl acetate, an acrylic ester, and the monocarboxylic acid.

The second stage of the process concerns grafting styrene onto the polymer backbone. The temperature of the emulsion is raised to about 73° to 77° C. There should be no sign of reflux. If there is reflux, the temperature should be held at about 67° C. until reflux does not occur when the temperature is again raised.

When the temperature of the emulsion reaches about 73° to 77° C., and preferably 75° C., styrene is added dropwise while at the same time a water solution of emulsifier and catalyst is added dropwise. After the addition of these ingredients, the temperature is maintained at about 75° C. for an additional period of about 15 minutes. Then an addition catalyst is added and the temperature is raised to about 87° to 93° C. for about 30 minutes to complete the reaction. The grafted latex is then cooled to room temperature and filtered. The theoretical yield is about 47 percent solids. The pH of the aqueous latex emulsion is about 5.0.

The use of a water-soluble accelerator is optional and if one is used, it may be charged separately or added with the emulsifier. Such materials are well-known in the art and may be, for example, sodium bisulfite, sodium thiosulfate, sodium metabisulfite, or sodium bicarbonate. When used, the amount of accelerator varies from about 0.1 to 1.0 percent of the total weight of the monomers.

The reaction and addition catalysts can be any of the various water-soluble per compounds known in the art, as for example, hydrogen peroxide in its free state as a solution in water or in a dry state bound to an inorganic salt, such as the perborates, or bound to organic materials, such as urea, or other free-radical generating reagents such as persulfates, percarbonates, and persilicates. The preferred reaction catalysts are potassium persulfate and ammonium persulfate. The preferred addition catalyst, when used, is t-butyl hydroperoxide, but others may be used. The amount of reaction catalyst used usually varies between about 0.1 to 1.0 percent by weight of the total content of monomers and the amount of addition catalyst, when used, varies between about 0.05 and 0.5% on the same weight basis.

The new latexes of the present invention can be added to other ingredients of a paper coating composition, to form a high gloss coating for paper and paperboard. They can be used as the only binder material for the pigment in the coating or they can be used with other binder materials, such as alpha-protein, starch, and polyvinyl alcohol, to bind the pigment to the paper.

Stable emulsions of the latexes of the present invention have been prepared wherein the emulsion has a polymeric latex to water ratio by weight ranging from about 30:70 to about 60:40.

DETAILED DESCRIPTION

The invention will be described in greater detail with the aid of the following examples which are given in illustration of the invention but are not intended as limitations thereon. Where parts are mentioned, they are parts by weight unless otherwise specified.

EXAMPLE 1

A stable aqueous emulsion of a latex was prepared according to the following formulation:

| First Stage | |
|---|---|
| Vinyl acetate | 470 parts |
| Methyl methacrylate | 166 parts |
| Methacrylic acid | 10 parts |
| Acrylic acid | 6 parts |
| Emulsifiers: | |
|    Alcolac ABEX 18S (35% solids) | 64 parts |
|    Alcolac SIPEX UB (30% solids) | 32 parts |
| Potassium persulfate | 2 parts |
| Sodium bicarbonate | 2 parts |
| Water | 1100 parts |
| Second Stage | |
| Styrene | 276 parts |
| Emulsifiers: | |
|    Alcolac ABEX 18S (35% solids) | 28 parts |
|    Alcolac SIPEX UB (30% solids) | 14 parts |
| Potassium Persulfate | 1 parts |
| Sodium bicarbonate | 0.4 parts |
| t-Butyl hydroperoxide | 5 drops |

A reaction vessel was charged with the water, the vessel was purged with nitrogen and sealed, and the temperature of the water was raised to about 67° C. First stage monomers were weighed out and mixed in a dropping funnel. The emulsifiers, potassium persulfate catalyst, and sodium bicarbonate accelerator were dissolved in about 240 parts water, and about 10 parts were added to the reaction vessel. With constant agitation with an impeller type of stirrer driven at about 300 r.p.m. throughout the process described below, the first stage monomers were metered into the reaction vessel simultaneously with the emulsifier-catalyst-accelerator mixture, over a period of about 120 minutes. When these additions to the reaction vessel were completed, the temperature was maintained at about 67° C. for an additional 30 minutes to complete the copolymerization reaction.

The second or grafting polymerization stage of the reaction began by gradually raising the temperature of the reaction mixture from 67° to about 75° C. over a period of about 30 minutes. The styrene monomer was then metered into the reaction vessel simultaneously with a separate mixture of the second stage emulsifiers, catalyst, and accelerator, all of which had been dissolved in about 90 parts water. These ingredients were added to the reaction mixture over a period of about 45 minutes. After these additions were completed, the temperature of the reaction mixture was maintained at about 75° C. for an additional period of about 15 minutes. Then the addition catalyst, t-butyl hydroperoxide, was added and the temperature of the reaction mixture was raised to about 90° C. for about 30 minutes to complete the reaction. The latex emulsion was then cooled to room temperature and the latex was filtered.

Evaluations showed the aqueous latex emulsion to be an alkali-swellable grafted latex having a solids content of about 47 percent. The polymer composition, by weight, was about 50.6 percent vinyl acetate, about 17.9 percent methyl methacrylate, about 1.7 percent of the combined acrylic acids, and about 29.7 percent styrene. The particle size of the latex particles was less than 0.1 micron at pH 5.0. The viscosity of the latex emulsion was about 50 cps. (Brookfield, No. 1 spindle, 20 r.p.m.) at pH 5.0 and increased to about 2,750 cps. (Brookfield, No. 4 spindle, 20 r.p.m.) at pH 8.5, indicating the alkali-swellable properties of the latex. The aqueous latex emulsion had good chemical and mechanical stability, being able to withstand vigorous agitation (12,000 r.p.m.) for more than 30 minutes.

EXAMPLES 2–7

Example 1 was repeated, except that various monomers were used to produce polymers with percentage compositions by weight as follows:

| Example No. | 2 | 3 | 4 | 5 | 6 | 7 |
|---|---|---|---|---|---|---|
| Polymer Composition, % | | | | | | |
| Vinyl acetate | 59 | 55 | 51 | 51 | 56 | 51 |
| Methyl methacrylate | 10 | 14 | 18 | — | — | 10 |
| Ethyl acrylate | — | — | — | 18 | — | — |
| Example No. | 2 | 3 | 4 | 5 | 6 | 7 |
| Polymer Composition, % | | | | | | |
| 2-Ethyl hexyl acrylate | — | — | — | — | 8 | — |
| Methacrylic acid | 1.6 | 1.6 | 1.6 | 1.6 | 1.6 | 1.6 |
| Acrylic acid | 0.4 | 0.4 | 0.4 | 0.4 | 0.4 | 0.4 |
| Styrene | 30 | 30 | 30 | 30 | 35 | 38 |

All of the above grafted polymers had good chemical, mechanical, and storage stabilities as required for commercial applications. Each latex was alkali-swellable, with the particles swelling at pH 8.5 to about 2–5 times their size at pH 5.

EXAMPLES 8–9

As stated previously, satisfactory latexes can be made by using one ethylenically unsaturated monocarboxylic acid, but much more alkali-swellable latexes are made if a mixture of such acids is used. Latexes were prepared according to the procedures described in Example 1, with the ingredients listed in weight percent:

| Example No. | 8 | 9 |
|---|---|---|
| Vinyl acetate | 51 | 51 |
| Methyl methacrylate | 18 | 18 |
| Methacrylic acid | 2 | 1.62 |
| Acrylic acid | — | 0.38 |
| Styrene | 30 | 30 |
| Latex viscosity, cps. | | |
| at pH 5.0 | 50 | 50 |
| at pH 8.5 | 100 | 2750 |

It can be seen from the viscosities that the latex prepared from a mixture of the acids had greater alkali-swellable properties as compared to the latex prepared from one acid.

EXAMPLE 10

The latexes of this invention can be used with conventional paper coating pigments in coating compositions. For example, a coating composition for paperboard was prepared by dispersing in water about 100 parts coating clay, about 16 parts (dry basis) of a latex prepared as in Example 1 as binder along with about 1 part protein, all parts being by weight, to give an aqueous coating composition having a solids content of about 60 percent. The coating composition was applied by a blade coater to a traveling web of 18 point paperboard to give a coat weight of about 6 pounds per 3,000 sq. ft. of paperboard surface. After drying, the coated paperboard was gloss-calendared with one nip heated to about 325° F., the calendar loading being about 200 p.l.i. The finished paperboard had a B & L gloss of about 75.

The latexes of this invention can be used as binders for the many conventional mineral pigments used in the paper industry, as well as with the synthetic pigments now on the market. For example, pigments such as clay, calcium carbonate and titanium dioxide, as well as synthetic pigments such as those prepared from polystyrene, can be used with the latexes of this invention. In aqueous coating compositions for paper and paperboard, as is known the latex binder comprises a minor amount of the coating composition solids while the major portion of the solids comprises the pigmentary component. In such coatings, where a synthetic pigment has been used and a latex according to Example 1 has been employed as a binder, coatings applied to paperboard at coat weights of about 6 pounds per 3,000 sq. ft. of paperboard surface have resulted in gloss levels in the range of about B & L 70–72, brightnesses of about 79, 15 minute ink hold-outs of about 52–55, wax picks of about 8—9, and gluabilities of about 90.

From the above, it can be seen that stable aqueous emulsions of latexes, wherein vinyl acetate is the major ingredient, can be produced by a copolymerization reaction followed by a grafting polymerization reaction. Further, as shown, the preferred latexes are alkali-swellable and therefore can be used with or as complete replacements for casein, alpha-protein, or starch as binders in aqueous coating compositions for paper and paperboard.

It is obvious that many variations may be made in the products and processes of this invention without departing from the spirit and scope thereof.

I claim:

1. An aqueous emulsion of an alkali-swellable polymeric latex having a polymeric latex to water weight ratio between about 30:70 and 60:40, said polymeric latex being prepared according to the process which comprises:
   a. initiating a copolymerization reaction between a mixture of monomers dispersed in water and consisting of by weight about 40 to 60 percent vinyl acetate, about 5 to 25 percent of an aliphatic ester of an $\alpha \beta$-ethylenically unsaturated monocarboxylic acid, and about 1 to 5 percent of an ethylenically unsaturated monocarboxylic acid in the presence of both a water-soluble polymerization catalyst and a water-soluble emulsifier, to produce a backbone polymer product from said monomers; and,
   b. adding to the reaction mixture about 10 to 40 percent by weight styrene and initiating a graft copolymerization between the backbone polymer product formed in step (a) above and the styrene to form the polymeric latex.

2. The aqueous emulsion of claim 1 wherein the ester is methyl methacrylate.

3. The aqueous emulsion of claim 1 wherein the ester is products acrylate.

4. The aqueous emulsion of claim 1 wherein the ester is 2-ethyl hexyl acrylate.

5. The aqueous emulsion of claim 1 wherein said polymeric latex comprises by weight about 50 to 59 percent vinyl acetate, about 10 to 18 percent of the aliphatic ester of an $\alpha$-$\beta$-ethylenically unsaturated monocarboxylic acid, about 30 to 38 percent styrene, and about 1 to 3 percent of the ethylenically unsaturated monocarboxylic acid.

6. The aqueous emulsion of claim 5 wherein the ester is methyl methacrylate.

7. The aqueous emulsion of claim 6 wherein the ethylenically unsaturated monocarboxylic acid is a mixture of methacrylic acid and acrylic acid.

8. The aqueous emulsion of claim 7 wherein the average particle size of the polymeric latex at about pH 5.0 ranges from about 0.05 to 0.15 micron.

9. An aqueous emulsion of an alkali-swellable polymeric latex having a partial size of less than 0.1 micron at about pH 5.0, and comprising by weight about 47 percent polymeric latex, said polymeric latex being prepared according to the process which comprises:
   a. initiating a copolymerization reaction between a mixture of monomers dispersed in water and consisting of by weight about 50 percent vinyl acetate, about 18 percent methyl methacrylate, and about 2 percent of a mixture of methacrylic acid and acrylic acid in the weight ratio, respectively, of about 1:1 to 1.75:0.25, in the presence of both a water-soluble polymerization catalyst and a water soluble emulsifier, to produce a backbone polymer product from said monomers; and,
   b. adding to the reaction mixture about 30 percent by weight styrene and initiating a graft copolymerization between the backbone polymer product formed in step (a) above and the styrene to form the polymeric latex.

10. The process of preparing an aqueous emulsion of a alkali-swellable polymeric latex comprising vinyl acetate as the major component, which process comprises the steps of:
    a. initiating copolymerization, at a temperature of about 65° to 70° C., of a reaction mixture of monomers comprising, by weight, about 40 to 60 parts vinyl acetate, about 5 to 25 parts of an aliphatic ester of an $\alpha$-$\beta$-ethylenically unsaturated monocarboxylic acid, and about 1 to 5 parts of an ethylenically unsaturated monocarboxylic acid, while the monomers are dispersed in water in the presence of a water-soluble polymerization catalyst and an anionic water-soluble emulsifier, to produce a backbone polymer from said monomers;
    b. raising the temperature of the reaction mixture to about 73° to 77° C.; and
    c. adding to the reaction mixture about 10 to 40 parts styrene and initiating graft copolymerization between the backbone polymer formed in step (a) above and styrene while in the presence of a water-soluble polymerization catalyst and an anionic water-soluble emulsifier.

11. The process of claim 10 wherein the ester is methyl methacrylate.

12. The process of claim 10 wherein the ester is ethyl acrylate.

13. The process of claim 10 wherein the ester is 2-ethyl hexyl acrylate.

14. The process of claim 10 wherein in step (a) thereof the reaction mixture of monomers comprises, by weight, about 50 to 59 parts vinyl acetate, about 10 to 18 parts of the aliphatic ester of an $\alpha$-$\beta$-ethylenically unsaturated monocarboxylic acid, and about 1 to 3 parts of the ethylenically unsaturated acid, and wherein in step (c) thereof about 30 to 38 parts styrene are added to the reaction mixture.

15. The process of claim 14 wherein the ester is methyl methacrylate.

16. The process of claim 15 wherein the ethylenically unsaturated monocarboxylic acid is a mixture of methacrylic acid and acrylic acid.

17. The process of preparing a stable aqueous emulsion of a synthetic polymeric latex which is alkali-swellable, which process comprises the steps of:
    a. charging a reaction vessel containing water heated to about 66° to 68° C. with a mixture of monomers comprising, by weight, about 50 parts vinyl acetate, about 18 parts methyl methacrylate, and about 2 parts of a mixture of methacrylic acid and acrylic acid in the weight ratio, respectively, of about 1:1 to 1.75:0.25;
    b. with the charging of the monomers, simultaneously charging the reaction vessel with a mixture of a water-soluble reaction catalyst and a water-soluble anionic emulsifier, to form a polymerizable reaction mixture;
    c. copolymerizing the monomers while maintaining the temperature of the reaction mixture at about 66° to 68° C., to produce a polymer from the monomers;
d. raising the temperature of the reaction mixture to a temperature of about 74° to 76° C.;
e. adding to the reaction mixture about 30 parts styrene;
f. with the adding of the styrene, simultaneously adding to the reaction mixture a mixture of a water-soluble catalyst and water-soluble anionic emulsifier, and initiating a grafting copolymerization reaction between the polymer formed in step (c) above and the styrene added in step (e) above; and
g. raising the temperature of the reaction mixture to a temperature of about 87° to 93° C., to complete the grafting reaction and produce the polymeric latex, the amount of water present in the reaction mixture being sufficient to provide the aqueous emulsion of polymeric latex with a weight ratio of latex to water between about 30:70 to 60:40.

* * * * *

UNITED STATES PATENT OFFICE
CERTIFICATE OF CORRECTION

Patent No. 3,687,884            Dated August 29, 1972

Inventor(s)     Denis K. Huang

It is certified that error appears in the above-identified patent and that said Letters Patent are hereby corrected as shown below:

In the title of the invention, a comma should be inserted between the words "ACID" and "STYRENE": "ALKALI-SWELLABLE POLYVINYL ACETATE GRAFTED LATEXES COMPRISING VINYL ACETATE, AN ALIPHATIC ESTER OF AN UNSATURATED MONOCARBOXYLIC ACID, STYRENE, AND AN UNSATURATED MONOCARBOXYLIC ACID".

Column 7, claim 1, line 10, "$\alpha\beta$" should read -- $\alpha$-$\beta$ --.

Column 7, claim 3, line 2, "products" should read -- ethyl --.

Column 7, claim 9, line 2, "partial" should read -- particle --.

Signed and sealed this 6th day of February 1973.

(SEAL)
Attest:

EDWARD M. FLETCHER, JR.
Attesting Officer

ROBERT GOTTSCHALK
Commissioner of Patents